United States Patent Office 3,249,609
Patented May 3, 1966

3,249,609
3,6-DIAZIDOPYRIDAZINE
Douglas I. Relyea, Pompton Plains, N.J., assignor to United States Rubber Company, New York, N.Y., a corporation of New Jersey
No Drawing. Filed Feb. 26, 1964, Ser. No. 347,373
1 Claim. (Cl. 260—250)

This invention relates to a new chemical compound, 3,6-diazidopyridazine, and to a method of making the compound.

The structure of this compound may be represented as the diazide

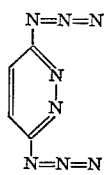

or by the tautomeric azolo-azide structure

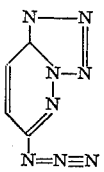

The present compound is useful as an explosive composition and as a curing agent for rubber.

According to the present invention the new compound may be prepared by the reaction of 3,6-dichloropyridazine with at least two equivalents of sodium azide in a suitable mutual solvent such as aqueous ethanol. The resultant mixture is then heated at from 60° to 100° C. until the reaction is essentially complete. The new compound is then recovered from the reaction mixture.

The invention may be illustrated by the following examples.

*Example I.—Preparation of 3,6-diazidopyridazine*

In a 500-ml. round-bottom flask are placed the following solutions:
(1) 14.9 g. (0.100 mole) of 3,6-dichloropyridazine, M.P. 69–70°, in 100 ml. of 95% ethanol; and
(2) 13.0 g. (0.200 mole) of sodium azide in 40 ml. of water.

The flask is then fitted with a condenser, and the clear solution is heated at reflux (80° C.) overnight.

The reaction mixture is filtered hot to remove a small amount of precipitated sodium chloride. Cooling the filtrate deposits 3,6-diazidopyridazine which is separated by filtration. The product is washed with a small amount of 60% ethanol and dried in a paper tray to give 4 g. (25% yield) of product, M.P. 129–130°.

*Example II.—Use of 3,6-diazidopyridazine as explosive*

The explosive nature of the compound of the present invention is easily demonstrated by placing a 5-mg. quantity of dry compound on a patch of abrasive paper and striking a moderate blow with a hammer. A detonation results and often a flash is visible. A similar flash and detonation occur when the 3,6-diazidopyridazine sample is dropped on a hot metal surface (300–400° C.).

*Example III.—Use of 3,6-diazidopyridazine as a curing agent*

The efficiency of the present compound as a curing agent for Royalene, a low-unsaturation ethylene-propylene-dicyclopentadiene terpolymer rubber, was demonstrated by curing the following rubber stocks in the Shawbury curometer, a well-known rubber cure testing instrument. In this example, the amounts given are in parts by weight.

|  | A | B | C |
|---|---|---|---|
| Royalene 201 | 25 | 25 | 25 |
| Carbon black (Philblack O) | 12.5 | 12.5 | 12.5 |
| Paraffinic petroleum oil | 2.5 | 2.5 | 2.5 |
| 3,6-Diazidopyridazine | 1.0 | | |
| Zinc oxide | | | 1.25 |
| Stearic acid | | | 0.25 |
| Tetramethylthiuram monosulfide | | | 0.38 |
| Mercaptobenzothiazole | | | 0.13 |
| Sulfur | | | 0.25 |
| Cured in curometer at 155° C.: | | | |
| $\Delta_8$* | 0.89 | 0.26 | 1.19 |
| $\Delta_{20}$* | 1.31 | 0.34 | 1.39 |

The symbols $\Delta_8$ and $\Delta_{20}$ refer to the decrease in curometer trace width observed at times of 8 minutes and 20 minutes, respectively. The asterisk in $\Delta_8$* and $\Delta_{20}$* indicates that the decrease in trace width has been corrected to a standard maximum width of 2.00 inches. In general, the greater the decrease ($\Delta$*) in trace width, the more extensively the rubber sample has been cured in the curometer. Specifically, a $\Delta$* of less than 0.4 indicates that less than a 10% increase in gelled rubber, as measured by extraction experiments, has occurred. A $\Delta$* of 1.3 or higher indicates that the rubber is over 80% gelled as measured by extraction of soluble rubber from the cured specimen. Thus, in the rubber containing 4 phr. of 3,6-diazidopyridazine (stock A above), extensive gelling or curing occurred in 20 minutes at 155° C. In the blank (stock B above) very little cure occurred under the same conditions. In the standard sulfur cure of Royalene (stock C above) a cure comparable to that achieved with the compound of the present invention resulted.

My new chemical will also cure other olefinic rubbers, natural and synthetic.

Having thus described my invention, what I claim and desire to protect by Letters Patent is:
3,6-diazidopyridazine.

References Cited by the Examiner

Boyer et al.: Chemical Reviews, vol. 54 (1954), pages 1–6.

HENRY R. JILES, *Primary Examiner.*